United States Patent
Henger et al.

(10) Patent No.: US 9,887,606 B2
(45) Date of Patent: Feb. 6, 2018

(54) ELECTRIC MACHINE WITH A RESISTOR FOR DISSIPATING SHAFT VOLTAGES

(71) Applicant: Robert Bosch GmbH, Stuttgart (DE)

(72) Inventors: Martin Henger, Tamm (DE); Bernd Schroeder, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 142 days.

(21) Appl. No.: 14/800,452

(22) Filed: Jul. 15, 2015

(65) Prior Publication Data
US 2016/0020681 A1 Jan. 21, 2016

(30) Foreign Application Priority Data
Jul. 15, 2014 (DE) .................. 10 2014 213 698

(51) Int. Cl.
| | | |
|---|---|---|
| H02K 11/00 | (2016.01) | |
| H02K 13/00 | (2006.01) | |
| H02K 7/08 | (2006.01) | |
| H02K 11/028 | (2016.01) | |
| H02K 13/02 | (2006.01) | |

(52) U.S. Cl.
CPC ............ *H02K 11/0094* (2013.01); *H02K 7/08* (2013.01); *H02K 7/083* (2013.01); *H02K 11/028* (2013.01); *H02K 13/003* (2013.01); *H02K 13/02* (2013.01)

(58) Field of Classification Search
CPC ...... H02K 11/0094; H02K 7/08; H02K 7/083; H02K 11/028; H02K 13/003; H02K 13/02; H02K 11/40; H01R 13/6485

USPC ............. 310/72, 219–252, 71, 67 R, 68 R; 29/597, 598
See application file for complete search history.

(56) References Cited

FOREIGN PATENT DOCUMENTS

| | | |
|---|---|---|
| DE | 3511755 | 10/1985 |
| DE | 19953564 | 5/2000 |
| DE | 10118004 | 11/2001 |
| DE | 10324619 | 12/2004 |
| DE | 102005031535 | 1/2007 |

OTHER PUBLICATIONS

English machine translation of DE 10324619; Dec. 2004; Germany.*
English machine translation of DE 102004040590; Mar. 2006; Germany.*

* cited by examiner

*Primary Examiner* — Bernard Rojas
*Assistant Examiner* — Ahmed Elnakib
(74) *Attorney, Agent, or Firm* — Michael Best & Friedrich LLP

(57) ABSTRACT

An electric machine with at least one electrical resistor (24) for dissipating shaft voltages occurring at the rotor shaft (2) of a rotor (1), in which the electrical resistor (24) is enclosed in a contact ring (13) mounted on the rotor shaft (2) between contact surfaces (17, 23, 25, 28, 29) applied to the contact ring (13) on the outside, and in which the resistor (24) is electrically connected via the contact surfaces (17, 23, 25, 28, 29) to the rotor shaft (2) on one side and to the excitation winding (14) of the rotor (1) on the other side.

11 Claims, 5 Drawing Sheets

Fig. 3
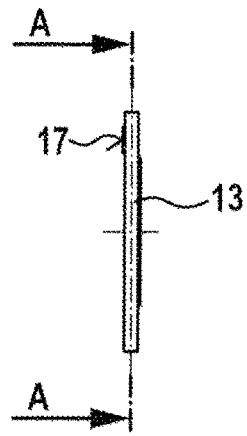
Fig. 4
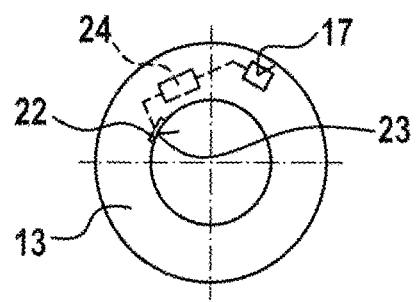
Fig. 5  A-A
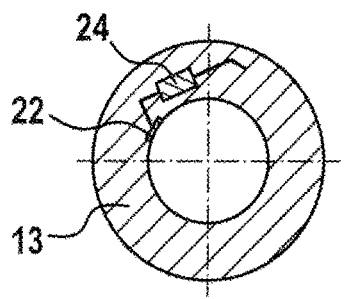

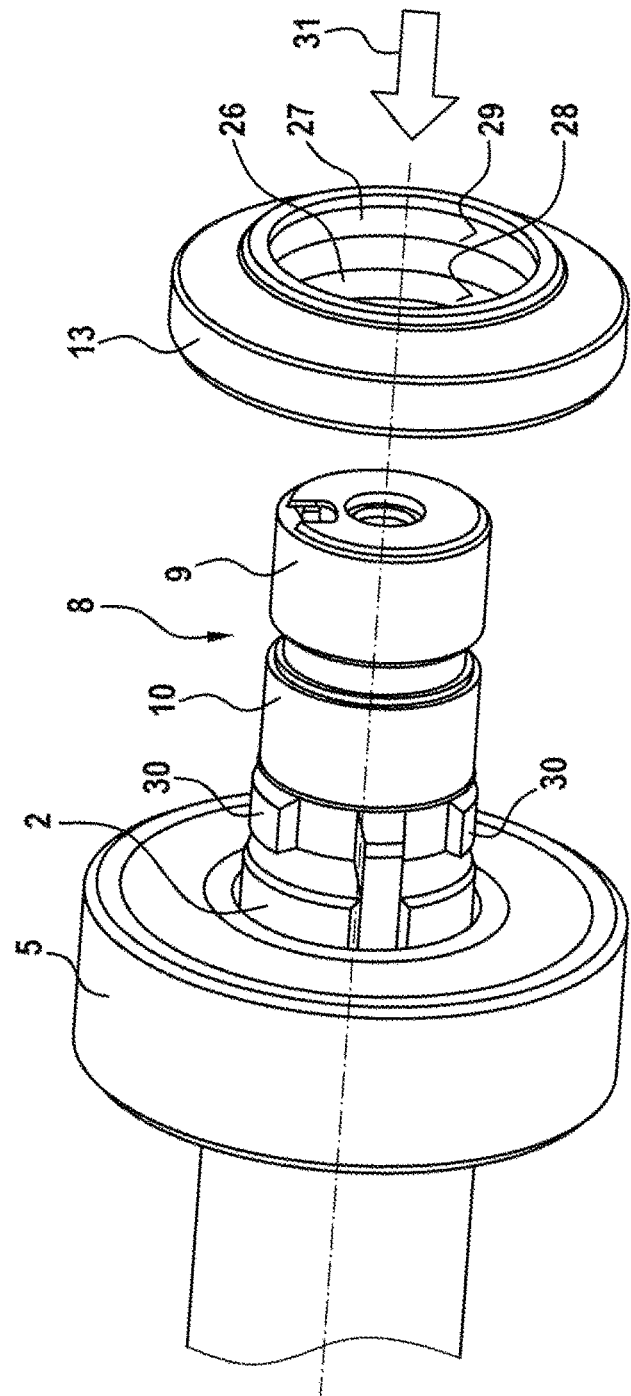

ELECTRIC MACHINE WITH A RESISTOR
FOR DISSIPATING SHAFT VOLTAGES

BACKGROUND OF THE INVENTION

The invention relates to an electric machine with at least one electrical resistor for dissipating shaft voltages occurring at the rotor shaft of a rotor.

It is known that so-called shaft voltages can be formed on the rotor shaft during operation of electric machines, it being possible for said shaft voltages to have different causes. One cause for the occurrence of shaft voltages may be the clocked actuation of the stator winding or the rotor winding using a pulse-width-modulated signal. However, it is also possible that electrostatic charges lead to high shaft voltages. By way of example, an electric machine operated as a generator can be driven via a belt, with the result that the rotor can be electrically charged via the belt.

If the occurring shaft voltages discharge themselves in a pulsed fashion via a bearing in which the rotor shaft is mounted, this can lead to spark erosion in the region of the bearing surfaces and hence to damage of the bearing. In the case of electric machines which are operated in motor vehicles, higher shaft voltages occur the higher the supply voltage of the vehicle electrical system and hence the operating voltage of the electric machine is.

Furthermore, the pulsed discharge of the charge carriers located on the rotor shaft leads to the formation of electromagnetic waves, which negatively influence the electromagnetic compatibility of the product. In particular, this can prevent disturbance-free functioning of electrical devices located in the vicinity.

An arrangement for dissipating shaft voltages for electric machines is known from DE 35 11 755 A1, in the case of which arrangement charge carriers are dissipated from the rotor shaft via a sliding contact. For this purpose, a capacitance acting between rotor shaft and ground is provided, to which capacitance an inductance can be connected in series.

An alternating-current generator with means for suppressing the static electricity stored on the rotor of said generator is known from DE 101 18 004 A1, in the case of which generator the excitation winding of the rotor can be connected via an ohmic resistor to the shaft of the rotor.

SUMMARY OF THE INVENTION

The electric machine according to the invention has the advantage that the electrical resistor used for dissipating shaft voltages can be mounted on the rotor shaft in a very simple manner. The resistor is integrated in a contact ring which has externally accessible contact surfaces via which necessary contact is made with the resistor enclosed in the contact ring. A contact ring such as this can be mounted by simple pressing onto the rotor shaft, wherein a secure fastening and a reliable electrical contact is ensured. The contact ring preferably consists of an electrically insulating plastics material which protects the enclosed electrical resistor against environmental influences.

A first contact surface provided on the contact ring can be electrically conductively connected to a negative slip ring of a slip-ring group arranged on the rotor shaft. Hence, an electrical connection to the excitation winding of the rotor is produced via the negative slip ring, while the enclosed electrical resistor is electrically conductively connected to the rotor shaft via another contact surface of the contact ring. The contact surfaces provided for this purpose can be applied laterally on the contact ring, wherein one contact surface can be electrically conductively connected to an electrical conductor leading to the excitation winding and another contact surface can be electrically conductively connected to a bearing ring, pressed onto the rotor shaft, of a ball bearing. The position of the contact ring is in this case between the excitation winding of the rotor and a shaft bearing arranged among a slip-ring group. The contact ring equipped with lateral contact surfaces can be designed as a relatively thin-walled, disk-shaped ring element, which thus has a very short axial length and a correspondingly low requirement on space.

The contact ring designed to be disk-shaped can have in each case one axially oriented and one radially oriented contact surface for making contact with the enclosed electrical resistor, wherein the axially oriented contact surface makes contact with a connecting lug of a conductor routed to the rotor winding and the radially oriented contact surface makes contact with the rotor shaft. Shaft voltages occurring on the rotor shaft can hence be dissipated via the electrical resistor enclosed in the contact ring, for example to the negative potential of the excitation winding.

The preferred embodiment of the invention provides that the contact ring has a first contact surface on its inner ring surface pointing toward the rotor shaft, which first contact surface abuts the rotor shaft, and a second contact surface, which abuts at least one contact segment of a negative slip ring of the slip-ring group applied to the rotor shaft. In the region of the contact surfaces, reliable contact can be ensured by a press fit. Secure fastening with simultaneous reliable electrical contact can be achieved by simple pressing-on of the contact ring, wherein the contact segments at the negative slip ring and the rotor shaft in the region of the fastening of the contact ring preferably have precisely the same diameter. For this purpose, the rotor shaft and the contact segments may be turned to a uniform diameter in a machining process.

The contact segment provided for making contact with the negative slip ring is preferably formed on the negative slip ring of the slip-ring group with a slightly greater diameter than the diameter of the slip-ring group. As a result of this, the contact ring can be pushed over the slip-ring group and fastened by means of a press fit on the rotor shaft and the shaped contact segment during mounting.

The electrical resistor integrated in the contact ring is preferably designed as an ohmic resistor with a resistance value of between 50 ohms and 10 kilohms. However, there is also the possibility for semiconductor elements or capacitive or inductive resistance elements to be integrated in the contact ring as electrical resistors. Which type of electrical resistor ought to be used depends on the respective requirements and, in particular, also on the area of use of the electric machine. However, for all electrical resistors used in this case, it is of great advantage that they are integrated in the contact ring and hence are protected in an optimum manner against external influences.

BRIEF DESCRIPTION OF THE DRAWINGS

Exemplary embodiments of the invention are illustrated in the drawings and explained in more detail in the following description.

In the figures:

FIG. 3 shows a lateral view of a contact ring as is used in the electric machine from FIG. 1, FIG. 4 shows the plan view of the contact ring from FIG. 3, FIG. 5 shows a cross section A-A of the contact ring from FIG. 3, FIG. 7 shows a perspective view of the region of the rotor shaft on which a contact ring with contact surfaces oriented radially inward is pressed.

DETAILED DESCRIPTION

Figure 1:
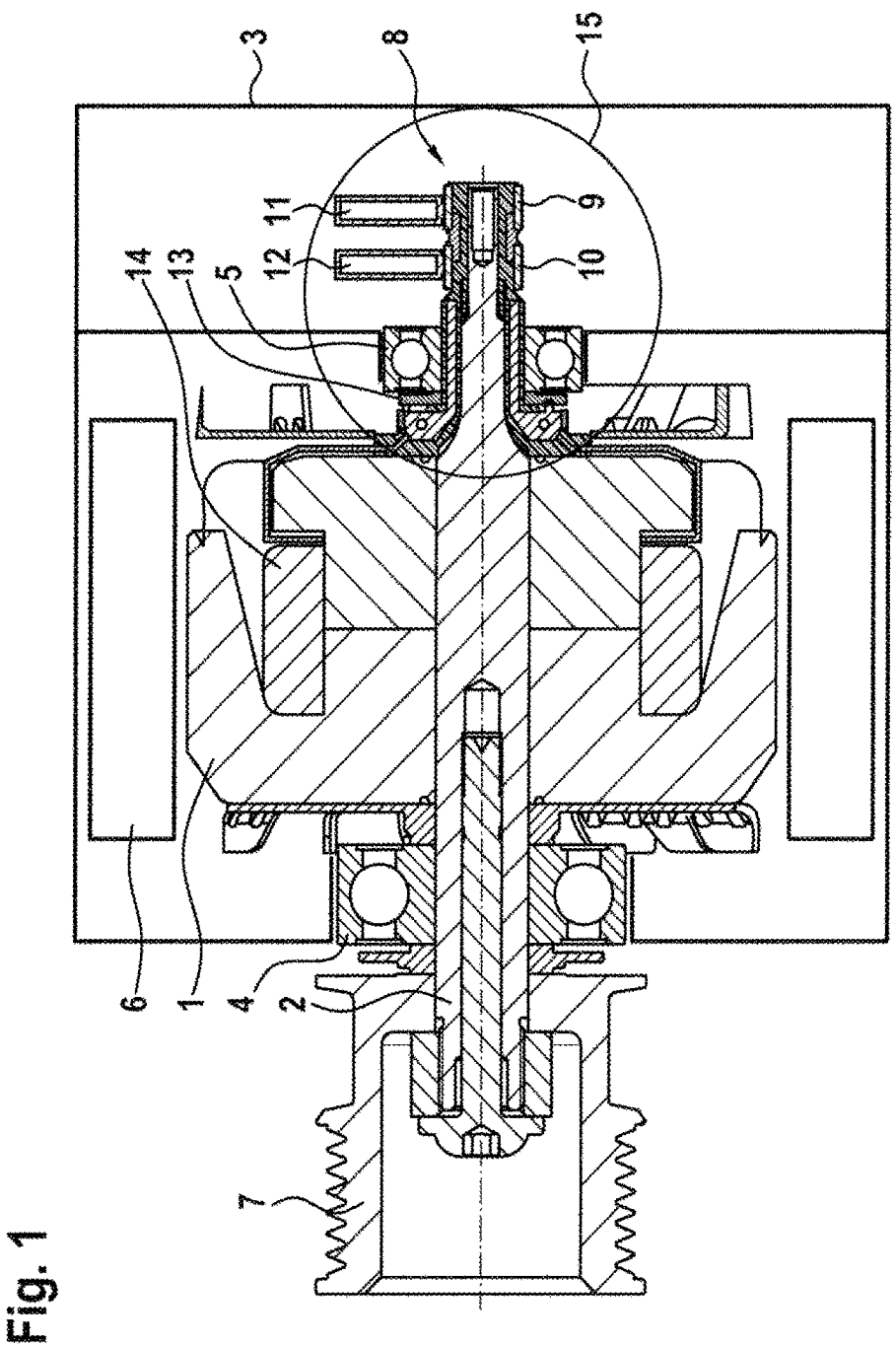
FIG. 1 shows a longitudinal section through an electric machine with a disk-shaped contact ring.

The electric machine illustrated in FIG. 1 consists substantially of a rotor 1 with a rotor shaft 2 which has been rotatably mounted in a housing 3, illustrated in outline, by means of ball bearings 4, 5 arranged on both sides. The rotor 1 is enclosed in an annular fashion by a stator 6 which is illustrated in a simplified manner. A pulley 7 is fastened at the end of the rotor shaft 2 which is illustrated on the left in the drawing, which pulley is used to transfer mechanical power. A slip-ring group 8 is located at the end of the rotor shaft 2 which is illustrated on the right in the drawing, at the slip rings 9, 10 of which slip-ring group 8 sliding contacts of brushes 11, 12 are present and not illustrated in more detail. The brushes 11, 12 and the housing 3 and the stator 6 are only illustrated in outline as these elements of the electric machine are not the subject matter of the present invention and can be considered to be generally known.

According to the invention, in the case of the electric machine illustrated in FIG. 1, a contact ring 13 is mounted on the rotor shaft 2 and provided with contact surfaces which are electrically conductively connected on one side to the excitation circuit of the rotor winding 14 and on the other side to the rotor shaft 2. Between said contact surfaces, an electrical resistor is enclosed in the contact ring 13, via which resistor electric charges can thus flow away from the rotor shaft 2 to the excitation circuit of the rotor winding 14. As a result of this, the occurrence of high shaft voltages at the rotor shaft 2 can be avoided.

Figure 2:
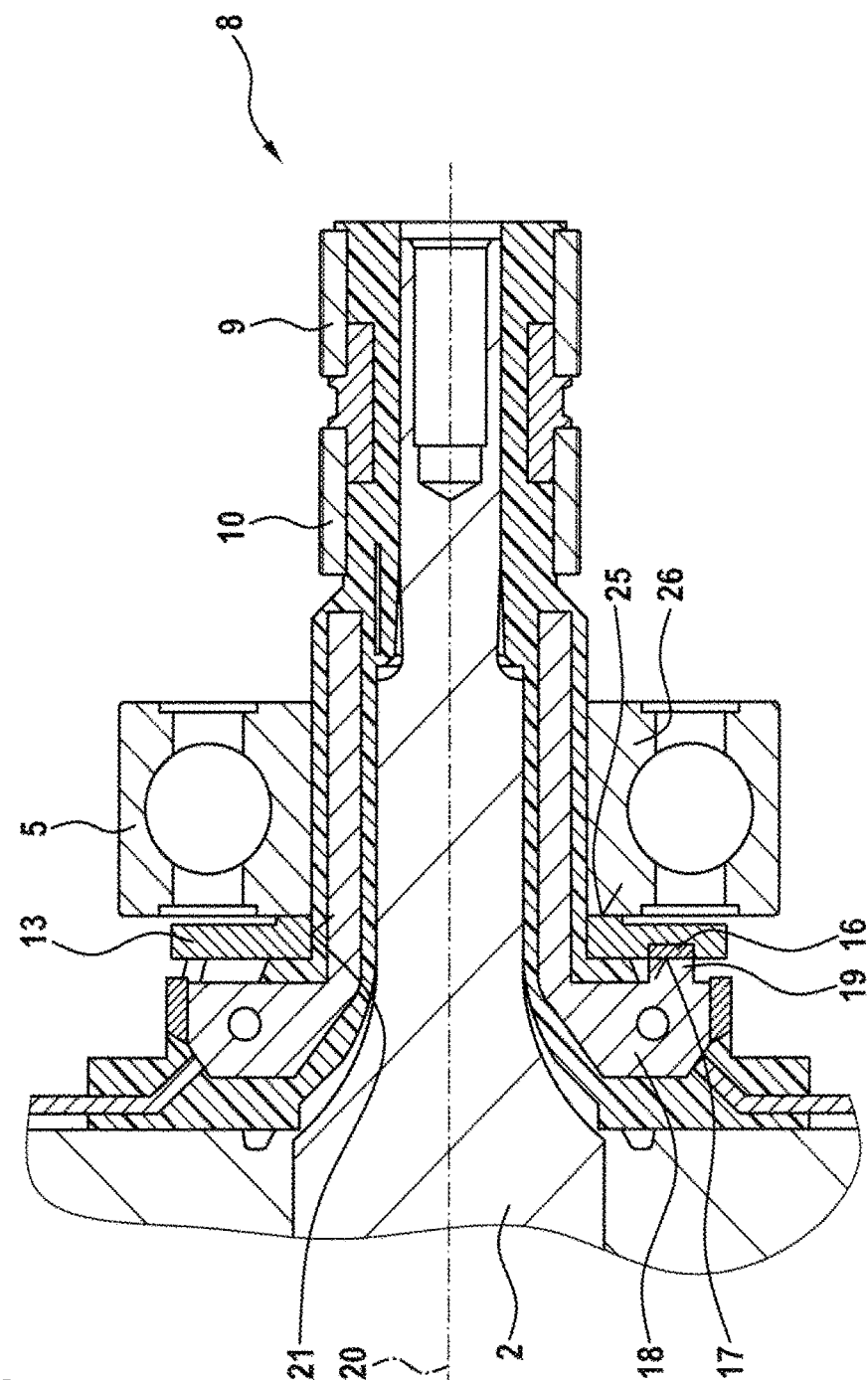
FIG. 2 shows an enlarged detail view of the electric machine from FIG. 1 in the region of the contact ring.

The partial region enclosed by a circle 15 in FIG. 1 is illustrated in an enlarged manner in FIG. 2.

The sectional view in FIG. 2, which is enlarged in comparison with FIG. 1, more clearly shows in particular the disk-shaped contact ring 13 with a laterally arranged contact element 16. A lateral contact surface 17 is formed on the contact element 16 and makes contact with a connecting lug 18 leading to the rotor winding. A contact projection 19 is formed on the connecting lug 18 for this purpose and electrically conductively abuts the contact surface 17.

A contact element 22, which can be seen in FIG. 4, is also applied to the inner ring surface 21 facing toward the center axis 20. Said contact element 22 likewise has a contact surface 23 which points radially toward the center axis 20 and is in electrically conductive contact with the rotor shaft 2. The positions of the two contact surfaces 17, 23 can be seen in the lateral view of FIG. 4.

In FIG. 2, the contact ring 13 is located between the bearing 5 and the region of the rotor which comprises the rotor winding. As a result, it is possible for very simple contact to be made with a connecting lug 18 of the rotor winding, wherein the connecting lug 18 is connected to the slip ring 10 which is the negative slip ring of the slip-ring group 8.

FIGS. 3 to 5 illustrate a contact ring 13 which has a lateral contact surface 17 on one side and a contact surface 23 which points radially inward on the other side. Between the two contact surfaces, an electrical resistor 24 is integrated in contact ring 13, which resistor is indicated in FIG. 4 with interrupted lines. In the sectional view of FIG. 5, the electrical resistor 24 is visible.

Instead of the embodiment of a disk-shaped contact ring 13, illustrated in FIGS. 3 to 5, with a radially inwardly pointing contact surface 23, the contact ring 13 can be equipped with a lateral contact surface 25 as is also illustrated in FIG. 2 and is in contact with the inner bearing ring 26 of the bearing 5. The metal inner bearing ring 26 is itself in turn fastened on the rotor shaft 2 and is thus in electrical contact with the rotor shaft 2. Hence, via a lateral contact surface 25 and via the bearing 5, electrical contact with the rotor shaft 2 can be produced. This enables an embodiment of a contact ring 13 with an integrated resistor 24, the contacts of which contact ring are electrically connected on one side to the contact surface 17 and on the other side to the contact surface 25. In this embodiment, a contact surface 23 which points radially inward can be dispensed with.

Figure 6:
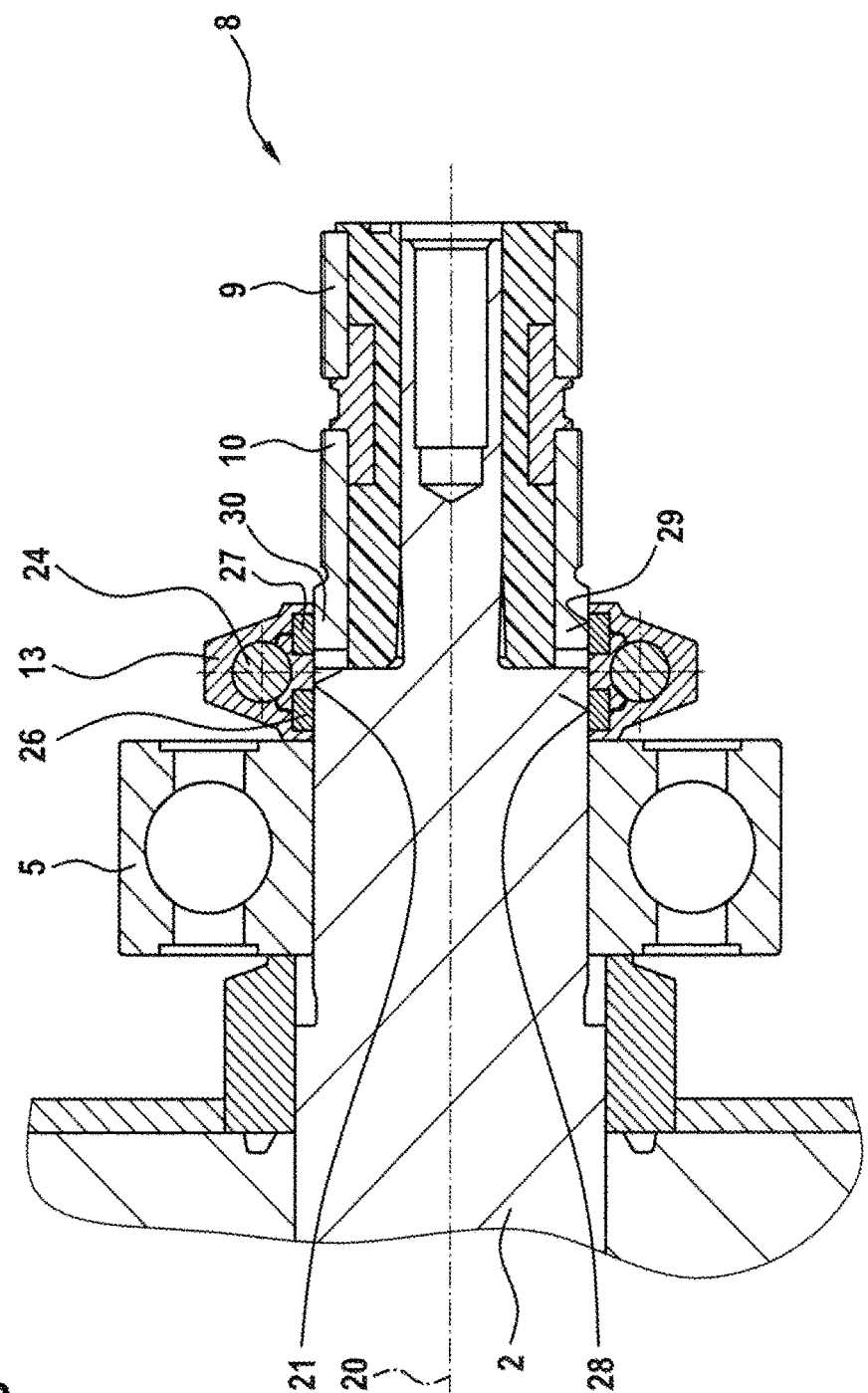
FIG. 6 shows a longitudinal section through an electric machine in the region of a contact ring which is in contact with the rotor shaft and a slip-ring group.

In the sectional view of FIG. 6, a contact ring 13 is provided between the slip-ring group 8 and the bearing 5, which contact ring has two contact rings 26, 27 arranged at a distance on its inwardly pointing ring surface 21. The two contact rings 26, 27 are connected to an electrical resistor 24 enclosed in the contact ring 13, with the result that an exchange of charge can take place between the contact rings 26, 27 via the electrical resistor 24 and hence shaft voltages which occur can be reduced. The contact rings 26, 27 are electrically conductively connected by their contact surfaces 28, 29 pointing toward the center axis 20 to the rotor shaft 2 on one side and to the slip ring 10, which is used as negative slip ring, on the other side. For this purpose, a contact segment 30 is formed on the slip ring 10 and has precisely the same outer diameter as the rotor shaft 2.

The electrical resistor 24 can be designed as an ohmic resistor in the present case and also in the above-described embodiments; however, it is also possible for reactive resistors and/or semiconductor elements to be used for this purpose as electrical resistance elements. In tests, in the case of an embodiment as ohmic resistor, resistance values between 50 ohms and 10 kilohms have been identified as optimal.

The detail view of FIG. 7 illustrates how the contact ring 13 provided in FIG. 6 is brought onto the rotor shaft 2 in the axial direction. For this purpose, the contact ring 13 is pushed in the direction of the arrow 31 over the slip-ring group 8 onto the rotor shaft 2 until the contact ring 13 comes to bear laterally against the bearing 5. The inwardly pointing contact surfaces 28, 29 of the contact rings 26, 27 are in this case pressed on one side onto the rotor shaft 2 and on the other side onto contact segments 30 of the slip ring 10, with the result that a secure seat for the contact ring 13 is obtained in the region of the contact surfaces 28, 29 by means of a press fit.

The basic body of the contact ring 13 preferably consists of a plastics material which is an electrical insulator and securely fixes the other elements, such as contact rings 26, 27 and the electrical resistor 24.

What is claimed is:
1. An electric machine comprising:
a rotor (1) having a rotor shaft (2) and an excitation winding (14);

a slip-ring group (8) arranged on the rotor shaft (2), wherein the slip-ring group includes at least one slip ring (9, 10);

a contact ring (13) mounted on the rotor shaft (2) and having a first side and a second side, wherein the inner diameter of the contact ring (13) is larger than the outer diameter of the at least one slip ring (9, 10) and the contact ring is pushed over the slip-ring group such that at least a portion of the at least one slip ring (9, 10) is between the contact ring (13) and the end of the rotor shaft (2) relative to a longitudinal axis (20) of the rotor shaft (2); and at least one electrical resistor (24) for dissipating shaft voltages occurring at the rotor shaft (2), wherein the electrical resistor (24) is enclosed in the contact ring (13) between contact surfaces (17, 23, 25, 28, 29) applied to the contact ring (13), and wherein the at least one electrical resistor (24) is electrically connected via the contact surfaces (17, 23, 25, 28, 29) to the rotor shaft (2) on the first side and to the excitation winding (14) on the second side.

2. The electric machine according to claim 1, wherein the at least one slip ring (9, 10) includes a first slip ring (10), characterized in that a first contact surface (17, 29) is electrically conductively connected to the first slip ring (10), which is used as a negative slip ring, of the slip-ring group (8).

3. The electric machine according to claim 1, characterized in that the contact ring (13) has at least one contact surface (23, 28) which is electrically conductively connected to the rotor shaft (2).

4. The electric machine according to claim 1, characterized in that the contact ring (13) has at least one contact surface (17, 25) arranged on a side surface of the contact ring (13).

5. The electric machine according to claim 1, characterized in that the contact ring (13) is disk-shaped and is arranged between the rotor winding (14) and a bearing (5), in which the rotor shaft (2) is mounted, on the rotor shaft (2).

6. The electric machine according to claim 5, characterized in that the contact ring (13) has one axially oriented and one radially oriented contact surface (17, 25; 23, 28, 29) for making contact with the enclosed electrical resistor (24), and in that the axially oriented contact surface (17) makes contact with a connecting lug (18) of a conductor routed to the rotor winding (14) and the radially oriented contact surface (23, 28) is disposed around the rotor shaft (2).

7. The electric machine according to claim 1, wherein the at least one slip ring includes a first slip ring (10), characterized in that the contact ring (13) has a first contact surface (28) on an inner ring surface pointing toward the rotor shaft (2), which first contact surface abuts the rotor shaft (2), and a second contact surface (29), which abuts at least one contact segment (30) of the first slip ring (10).

8. The electric machine according to claim 7, characterized in that the first slip ring (10) is used as a negative slip ring.

9. The electric machine according to claim 7, characterized in that the contact ring (13) is fastened by means of a press fit in the region of contact surfaces (23, 28, 29) pointing radially toward the rotor shaft (2).

10. The electric machine according to claim 1, characterized in that the electrical resistor (24) has an ohmic resistance value of between 50 ohms and 10 kilohms.

11. The electric machine according to claim 1, where in the contact ring (13) is formed with an electrically insulating material.

* * * * *